United States Patent [19]
Erisman

[11] Patent Number: 5,675,481
[45] Date of Patent: *Oct. 7, 1997

[54] DRIVE SIGNAL CONTROLLED UNDER-VOLTAGE LOCKOUT CIRCUIT

[75] Inventor: Brian P. Erisman, Colorado Springs, Colo.

[73] Assignee: Toko, Inc., Japan

[*] Notice: The term of this patent shall not extend beyond the expiration date of Pat. No. 5,497,312.

[21] Appl. No.: 610,326

[22] Filed: Mar. 4, 1996

Related U.S. Application Data

[62] Division of Ser. No. 62,418, May 13, 1993, Pat. No. 5,497,312.
[51] Int. Cl.$^6$ .................................. H02M 7/517
[52] U.S. Cl. .................. 363/49; 363/95; 363/97
[58] Field of Search ................... 363/16, 49, 95, 363/97, 131

[56] References Cited

U.S. PATENT DOCUMENTS

| | | | |
|---|---|---|---|
| 4,333,136 | 6/1982 | Baker | 363/49 |
| 4,450,514 | 5/1984 | Peruth | 363/49 |
| 4,992,718 | 2/1991 | Kumaki | 363/49 |
| 5,262,933 | 11/1993 | Shyi-Hon | 363/49 |
| 5,264,782 | 11/1993 | Newton | 363/49 |
| 5,497,312 | 3/1996 | Erisman | 363/49 |

*Primary Examiner*—Jeffrey L. Sterrett
*Attorney, Agent, or Firm*—William E. Hein

[57] ABSTRACT

A MOSFET driven integrated circuit or other peripheral circuit interfaced to a controller that operates on the primary side of a DC to DC converter having a high input voltage relative to the supply voltage powering both the controller and the MOSFET driver or other peripheral circuit is controlled by an under-voltage lockout circuit to transition from a standby mode to a normal operating mode of the MOSFET driver or other peripheral circuit only when the supply voltage is sufficient to sustain normal operation and the driver or other peripheral circuit senses activity at an input that indicates that the controller has previously transitioned from a standby mode to a normal operating mode.

4 Claims, 2 Drawing Sheets

5,675,481

DRIVE SIGNAL CONTROLLED UNDER-VOLTAGE LOCKOUT CIRCUIT

REFERENCE TO RELATED APPLICATION

This is a division of application Ser. No. 08/062,418 filed May 13, 1993, now issued as U.S. Pat. No. 5,497,312.

BACKGROUND AND SUMMARY OF THE INVENTION

This invention relates generally to DC to DC power conversion and more particularly to an under-voltage lockout circuit that facilitates a simplified and efficient start-up of power supplies that perform DC to DC conversion and which have an input DC voltage that is substantially larger than the voltage used to supply power to the control circuitry of the power supply. The under-voltage lockout circuit of the present invention is intended for incorporation into circuits that are used to interface with the main control circuit for the power supply, in which the main control circuit or controller that is electrically connected to the input DC circuitry of the power supply. The under-voltage lockout circuit of the present invention enjoys the most beneficial application in combination with those main control circuits that employ a hysteretic under-voltage lockout feature.

Off-line switching power supplies are well understood to be those power supplies which are powered by the voltage of the AC mains used in commercial power distribution. The most common range of nominal AC mains voltage worldwide is 100 VAC–240 VAC. The most cost effective way to control an off-line switching power supply is to use a control integrated circuit, simply called a controller, which is electrically connected to the primary side of the power supply. The primary side of the power supply is commonly understood to be that side which is electrically connected to the line voltage that provides the input to the power supply. Off-line switching power supplies are commonly configured to include a bridge rectifier, whose AC terminals are connected to the line voltage and whose DC terminals are connected to a large energy storage capacitor. In this configuration, the large capacitor develops a voltage having a substantial DC component across its terminals. This voltage is commonly referred to as the bus voltage. The magnitude of the bus voltage is roughly that of the line voltage. As the magnitude of the line voltage tends to be in the range of low hundreds of volts, so also is the bus voltage. It is this bus voltage that is used by the inverter portion of the switching power supply to perform DC to DC power conversion.

A common prior art controller employed in off-line power supplies is illustrated in FIG. 1. The controller is connected to the primary side of the power supply. The more negative potential of the bus voltage is referred to as the bus return, and all other primary voltages, except the input line voltage, are referenced to the bus return. A capacitor C1 is connected across the bus voltage. A ground or reference terminal of the controller U1 is connected to the bus return. A capacitor C2, referred to as a supply capacitor in this prior art circuit application, is connected between the supply node of controller U1 and the bus return. A resistor R1 is connected between the positive bus potential and the supply node. An auxiliary winding of the main transformer T1 is connected between the anode of a diode D1 and the bus return. The cathode of diode D1 is connected to the supply node. The auxiliary winding of transformer T1 is polarized in such a way as to be able to sustain power to controller U1 during the normal operation of the power supply. An output node of controller U1 is connected to the gate terminal of a power MOSFET Q1. The source terminal of power MOSFET Q1 is connected to the bus return, and the drain terminal is connected to one terminal of the main primary winding of transformer T1, the other terminal of which is connected to the positive bus potential.

It is desirable that primary side controllers employed in off-line switching power supplies initially operate in a standby mode before sufficient voltage has been applied to the supply node of the controller. The controller should remain in the standby mode until the supply voltage has reached a certain threshold known as the turn-on threshold. The standby mode of the controller is typically characterized as a non-operating mode that requires a relatively low current draw into the supply node. After the turn-on threshold is reached, a normal operating mode of the controller is initiated during which the controller tends to draw substantially more current from the supply node than during the standby mode. The controller continues to operate even if the supply voltage is thereafter lowered to any potential not less than a certain turn-off threshold. This feature is commonly referred to as hysteretical under-voltage lockout (HUVL) and is implemented on many primary side controllers. Resistor R1 of the prior art circuit of FIG. 1 is usually chosen such that it is not able to supply much more current than that required by the controller when it operates in the standby mode. Therefore, once the normal operating mode is initiated, the potential at the supply node will begin to decrease. This is to say that the current drawn into the supply node of the controller is greater than the current which is being provided through the resistor R1. This causes current to be drawn out of the supply capacitor, resulting in a decrease in supply voltage. If the supply capacitor is sufficiently large, it may adequately supply the current required by the controller until such time as the auxiliary winding on the main transformer can begin to sustain the voltage and supply the current required by the controller in the normal operating mode. This reinforcement of the supply voltage by the auxiliary transformer winding must occur before the turn-off threshold of the controller is reached. Since the controller must turn on before the power supply can turn on, this particular technique for powering the controller may be called a start-up technique.

In some applications involving certain prior art controllers, it may not be practical for the controller U1 of FIG. 1 to drive the MOSFET Q1 directly. In those situations, the designer may wish to use a MOSFET driver integrated circuit, sometimes simply called a driver. A common configuration for a driver has its input connected to the output of the controller and its output connected to the gate terminal of Q1. A ground or reference terminal of the driver is connected to the bus return. The supply terminal of the driver is connected to the supply terminal of the controller (i.e. the supply node). An example of such a prior art configuration is depicted in FIG. 2, in which the driver is labeled as component U2. This prior art configuration presents a problem in connection with the start-up technique previously described. If the driver U2 does not have HUVL, as does the controller U1, resistor R1, if chosen as described above, will not be able to supply sufficient current to raise the potential at the supply node high enough to initiate the normal operating mode of the controller. That is, the driver U2 will draw too much current from the supply. If the driver U2 has HUVL and its turn-on threshold happens to be incrementally lower than that of the controller U1, the supply voltage will still never be able to reach a high enough potential to initiate the normal operating mode of the controller U1. If the driver U2 has HUVL and its turn-on threshold happens to be incrementally higher than that of the controller U1, the supply voltage will never be able to reach a high enough potential to initiate the normal operating mode of the driver U2. This means that some other more complex circuitry than the prior art circuit of FIG. 1 will be required to initiate normal operation of the power supply. Alternatively, resistor R1 must be of sufficiently low resistance that it will be able to supply current to either or both the controller U1 and driver U2 integrated circuits during the operating mode. This latter alternative results in unacceptably high power dissipation in the resistor R1 because of the large voltage drop between the positive bus potential and the supply potential. In other applications, the driver U2 may not be required, but some other peripheral circuit (i.e. a circuit controlled at least in part by the controller U1) may be required. It may be desirable to configure this peripheral circuit to have its supply and ground/reference nodes connected in common with those of the controller U1. A problem similar to that just described exists in such a circuit configuration as well.

It is therefore the principal object of the present invention to provide a MOSFET driver integrated circuit or other peripheral circuit interfaced to a controller that operates on the primary side of a DC to DC converter having a high input voltage relative to the operating supply voltage of the driver or other peripheral circuit in which transition from a standby mode to a normal operating mode of the MOSFET driver or other peripheral circuit occurs only when the supply voltage is sufficient to sustain normal operation and the driver or other peripheral circuit senses activity at an input that indicates that the controller has previously transitioned from a standby mode to a normal operating mode.

This and other objects are accomplished in accordance with the illustrated preferred embodiment of the present invention by providing an under-voltage lockout circuit that includes a first threshold sensor for sensing the supply voltage, a second threshold sensor for sensing a transition from the standby mode to the normal mode of operation of the controller, logic circuitry coupled to receive an output logic signal from each of the first and second threshold sensors, and switch means, coupled to receive the output logic signal and to control application of the supply voltage to the MOSFET driver or other peripheral circuit in response thereto.

DETAILED DESCRIPTION OF THE INVENTION

Figure 1:
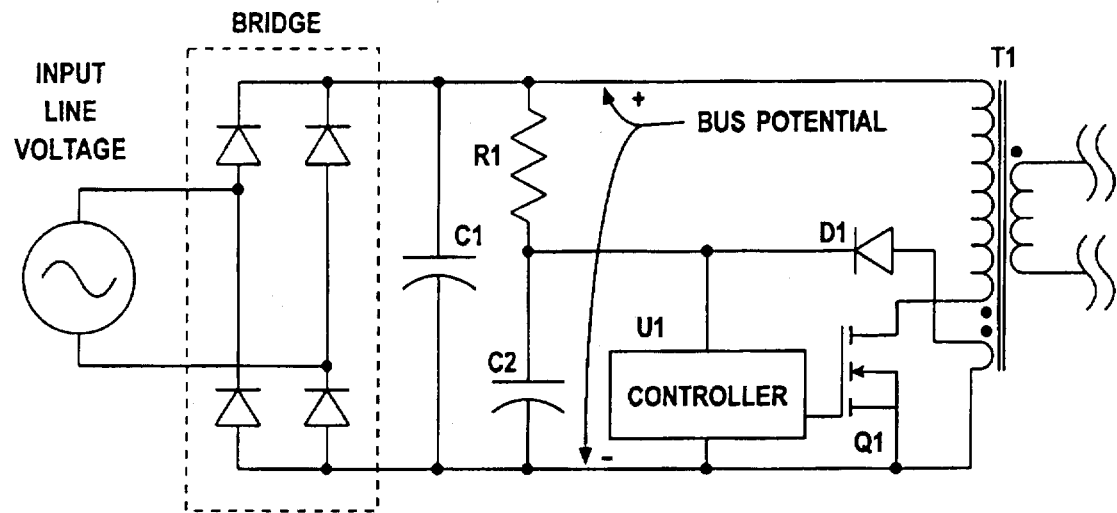
FIG. 1 is a circuit diagram of a prior art DC to DC converter employing a controller to drive a MOSFET switching device.
Figure 2:
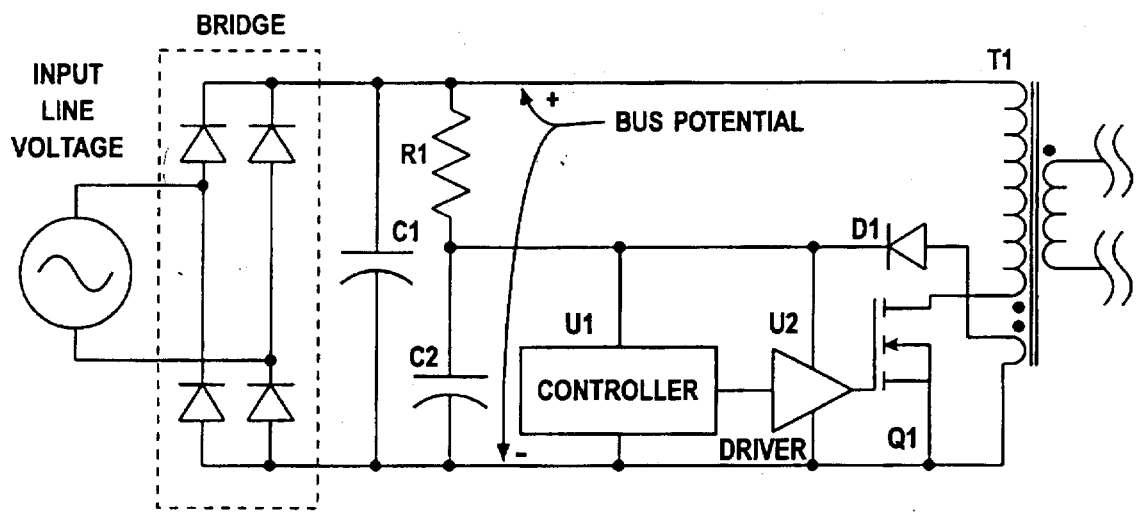
FIG. 2 is a circuit diagram of the prior art DC to DC converter of FIG. 1 in which a driver integrated circuit is interposed between the controller and the MOSFET switching device.
Figure 3:
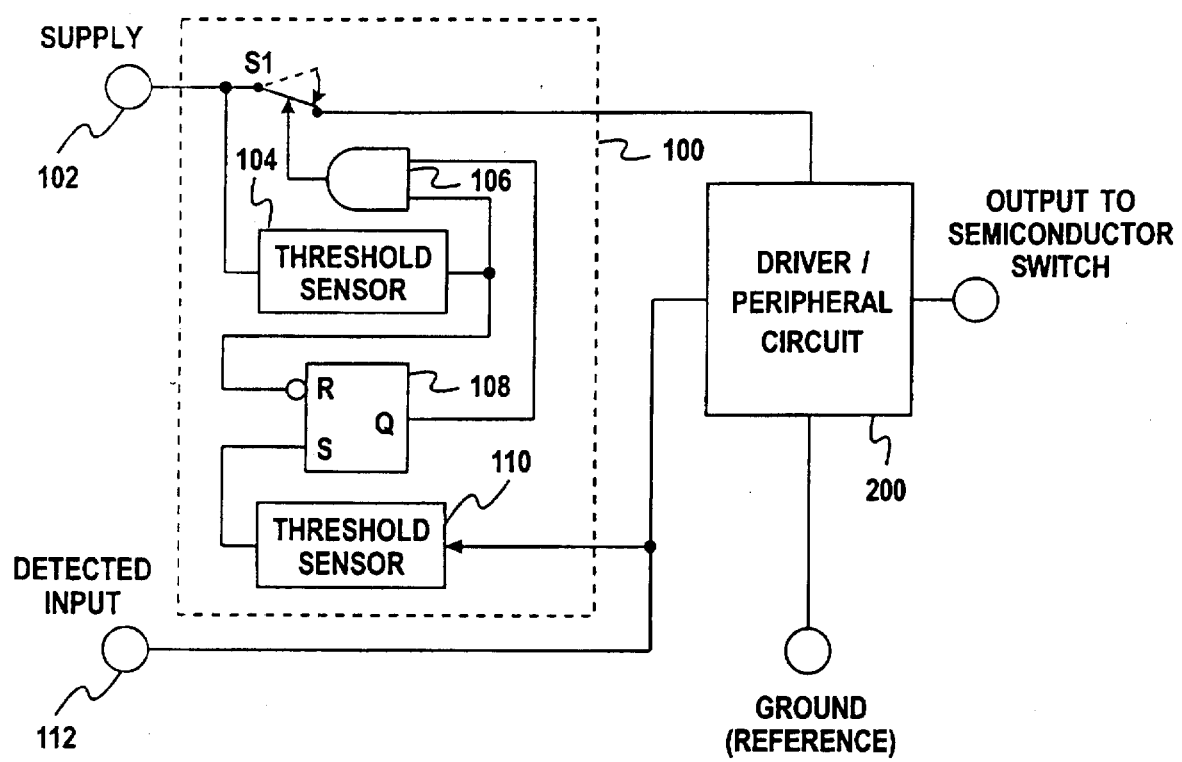
FIG. 3 is a diagram of an under-voltage lockout circuit in accordance with the present invention that may be employed in combination with either of the prior art DC to DC converter circuits of FIGS. 1 and 2.

Referring now to FIG. 3, there is shown an under-voltage lockout circuit in accordance with the present invention as it may be employed in combination with a prior art driver or other peripheral circuit 200, such as may be interfaced to a controller in a power converter. When a source of supply voltage 102 is above a given threshold level, the output of a threshold sensor 104 will be at a high logic level. Otherwise, the output of threshold sensor 104 will be at a low logic level. The output of threshold sensor 104 is applied to one input of an AND gate 106 and to the inverting reset input R of an SR-latch 108. At such time as another threshold sensor 110 senses activity at a detected input 112, which may comprise, for example, the output of a controller interfaced to driver or other peripheral circuit 200, its output produces a high logic level at the set input S of SR-latch 108. Threshold sensor 110 may comprise any of a number of conventional circuits that are operative for detecting conditions such as a particular voltage level, the occurrence of a voltage transient, etc. SR-latch 108 is arranged such that whenever its inverting input R is low, its Q output will also be low. Only when both the R and S inputs of SR-latch 108 are simultaneously high will the output Q transition from low to high. When the output of AND gate 106 is low, a switch S1 is open, and the current flowing from the source of supply voltage 102 is very low because driver or other peripheral circuit 200 is not powered. Only the undervoltage lockout circuit 100 is powered. When the output of AND gate 106 is high, switch S1 is closed, and the source of supply voltage 102 is applied to the driver or other peripheral circuit 200, thus allowing it to draw supply current and operate in the normal operating mode.

In summary, the under-voltage lockout circuit of the present invention, operating in combination with a conventional DC to DC converter, allows a supply current that is lower than otherwise possible to initiate the start-up of a parallel combination of a controller with HUVL and a driver or other peripheral circuit that forms part of the DC to DC converter. This, in turn, causes start-up of the DC to DC converter. By allowing a reduction in the supply current required to initiate operation of the DC to DC converter, reductions in circuit complexity and power dissipation are also achieved.

I claim:

1. In a power converter employing DC to DC power conversion, said power converter configured to include a semiconductor switch device, a controller for providing a switch signal to control a duty ratio of said semiconductor switch device to thereby regulate the output of the power converter, and a driver coupled between said semiconductor switch device and said controller for receiving said switch signal and for driving said semiconductor switch device in accordance therewith, the improvement comprising an under-voltage lockout circuit for maintaining a standby mode of operation of said power converter when a supply voltage powering both said controller and said driver is below a predetermined threshold level and for enabling a normal mode of operation of said power converter when said supply voltage rises above said predetermined threshold level and said controller has transitioned from a standby mode to a normal mode of operation, said under-voltage lockout circuit comprising:

a first threshold sensor for sensing said supply voltage;

a second threshold sensor for sensing a transition from said standby mode to said normal mode of operation of said controller;

logic means for receiving an output logic signal from each of said first and second threshold sensors; and transition means, coupled to said logic means, for receiving said output logic signal therefrom and for transitioning said driver from a standby mode to a normal operating mode in response thereto.

2. A power converter as in claim 1 wherein said semiconductor switch device comprises a power MOSFET and said driver comprises a power MOSFET driver.

3. In a power converter employing DC to DC power conversion, said power converter configured to include a semiconductor switch device, a controller for providing a switch signal to control a duty ratio of said semiconductor switch device to thereby regulate the output of the power converter, and a peripheral circuit interfaced to said controller, the improvement comprising an under-voltage lockout circuit for maintaining a standby mode of operation of said peripheral circuit when a supply voltage powering both said controller and said driver is below a predetermined threshold level and for enabling a normal mode of operation of said peripheral circuit when said supply voltage rises above said predetermined threshold level and said controller has transitioned from a standby mode to a normal mode of operation, said under-voltage lockout circuit comprising:

a first threshold sensor for sensing said supply voltage;

a second threshold sensor for sensing a transition from said standby mode to said normal mode of operation of said controller;

logic means for receiving an output logic signal from each of said first and second threshold sensors; and transition means, coupled to said logic means, for receiving said output logic signal therefrom and for transitioning said driver from a standby mode to a normal operating mode in response thereto.

4. A power converter as in claim 3 wherein said semiconductor switch device comprises a power MOSFET.

* * * * *